(12) United States Patent
O'Brien-Strain

(10) Patent No.: US 8,683,326 B2
(45) Date of Patent: Mar. 25, 2014

(54) SPATIOTEMPORAL MEDIA OBJECT LAYOUTS

(75) Inventor: Eamonn O'Brien-Strain, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 12/991,431

(22) PCT Filed: May 6, 2008

(86) PCT No.: PCT/US2008/005842
§ 371 (c)(1),
(2), (4) Date: Nov. 6, 2010

(87) PCT Pub. No.: WO2009/136888
PCT Pub. Date: Nov. 12, 2009

(65) Prior Publication Data
US 2011/0060979 A1    Mar. 10, 2011

(51) Int. Cl.
*G06F 17/00* (2006.01)
*G06F 3/048* (2013.01)

(52) U.S. Cl.
USPC ............ 715/243; 715/205; 715/273; 715/788

(58) Field of Classification Search
USPC ......... 715/200–205, 207, 209, 210, 231, 234, 715/243, 252–256, 273, 700, 760, 788
See application file for complete search history.

(56) References Cited

U.S. PATENT DOCUMENTS

| 5,669,006 | A * | 9/1997 | Joskowicz et al. ............ 715/202 |
| 6,223,183 | B1 * | 4/2001 | Smith et al. .......................... 1/1 |
| 6,907,563 | B1 | 6/2005 | Kumar |
| 7,062,712 | B2 | 6/2006 | Schneider et al. |
| 7,143,083 | B2 | 11/2006 | Carlbom |
| 7,180,516 | B2 * | 2/2007 | Kapler et al. ................. 345/418 |
| 7,231,144 | B2 | 6/2007 | Tanaka et al. |
| 7,499,046 | B1 * | 3/2009 | Wright et al. ................. 345/418 |
| 7,702,996 | B2 * | 4/2010 | Mizutani et al. .............. 715/203 |

(Continued)

FOREIGN PATENT DOCUMENTS

| JP | 1996-030637 | 2/1996 |
| JP | 1999-219369 | 8/1999 |

(Continued)

OTHER PUBLICATIONS

International Search Report and Written Opinion received in counterpart International Patent Application No. PCT/US2008/005842 (date mailed: Jan. 22, 2009).

(Continued)

*Primary Examiner* — Maikhanh Nguyen

(57) ABSTRACT

A determinate spatiotemporal layout specification (20) automatically is generated in accordance with a relative spatiotemporal layout specification (14). The relative spatiotemporal layout specification (14) describes relative spatial positions and temporal order of media object types. The determinate spatiotemporal layout specification (20) describes a layout of media objects (18) in a display area (46) over time. The process of generating the determinate spatiotemporal layout specification (20) includes determining for each of the media objects (18) a respective spatiotemporal slot corresponding to a respective window in the display area (46) over a respective rendering period in which the media object (18) is scheduled to be rendered. The determinate spatiotemporal layout specification (20) is outputted.

20 Claims, 8 Drawing Sheets

Automatically Generate A Determinate Spatiotemporal Layout Specification Over Time In Accordance With A Relative Spatiotemporal Layout Specification — 22

Output The Determinate Spatiotemporal Layout Specification — 24

(56) References Cited

U.S. PATENT DOCUMENTS

| | | |
|---|---|---|
| 7,743,322 B2 * | 6/2010 | Atkins .......................... 715/243 |
| 2002/0122067 A1 | 9/2002 | Geigel et al. |
| 2003/0192049 A1 | 10/2003 | Schneider et al. |
| 2004/0186723 A1 * | 9/2004 | Mizutani et al. ............ 704/270.1 |
| 2005/0012743 A1 * | 1/2005 | Kapler et al. ................. 345/419 |
| 2005/0071783 A1 * | 3/2005 | Atkins .......................... 715/851 |
| 2005/0177593 A1 | 8/2005 | Solomon |
| 2005/0286738 A1 | 12/2005 | Sigal |
| 2007/0033612 A1 | 2/2007 | Lerman et al. |
| 2007/0033632 A1 * | 2/2007 | Baynger et al. ............... 725/135 |
| 2007/0171716 A1 * | 7/2007 | Wright et al. ............ 365/185.12 |

FOREIGN PATENT DOCUMENTS

| | | |
|---|---|---|
| JP | 2000-149045 | 5/2000 |
| JP | 2000149045 A | 5/2000 |
| JP | 2006-114013 | 4/2006 |

OTHER PUBLICATIONS

Tina Schneider et al., "Description and Narrative in Hypervideo," Proceedings of the 34th Hawaii International Conference on System Sciences—2001.

* cited by examiner

SPATIOTEMPORAL MEDIA OBJECT LAYOUTS

BACKGROUND

Individuals and organizations are rapidly accumulating large collections of digital content, including still images, text, graphics, animated graphics, and full-motion video images. This content may be presented individually or combined in a wide variety of different forms, including documents, catalogs, presentations, still photographs, commercial videos, home movies, and metadata describing one or more associated digital content files. As these collections grow in number and diversity, individuals and organizations increasingly will require systems and methods for organizing and presenting the digital content in their collections. To meet this need, a variety of different systems and methods for organizing and presenting digital image content are needed.

SUMMARY

In one aspect, the invention features a method in accordance with which a determinate spatiotemporal layout specification automatically is generated in accordance with a relative spatiotemporal layout specification. The relative spatiotemporal layout specification describes relative spatial positions and temporal order of media object types. The determinate spatiotemporal layout specification describes a layout of media objects in a display area over time. The process of generating the determinate spatiotemporal layout specification includes determining for each of the media objects a respective spatiotemporal slot corresponding to a respective window in the display area over a respective rendering period in which the media object is scheduled to be rendered. The determinate spatiotemporal layout specification is outputted.

The invention also features apparatus and a computer-readable medium storing computer-readable instructions causing a computer to implement the method described above.

Other features and advantages of the invention will become apparent from the following description, including the drawings and the claims.

DETAILED DESCRIPTION

Figure 1:
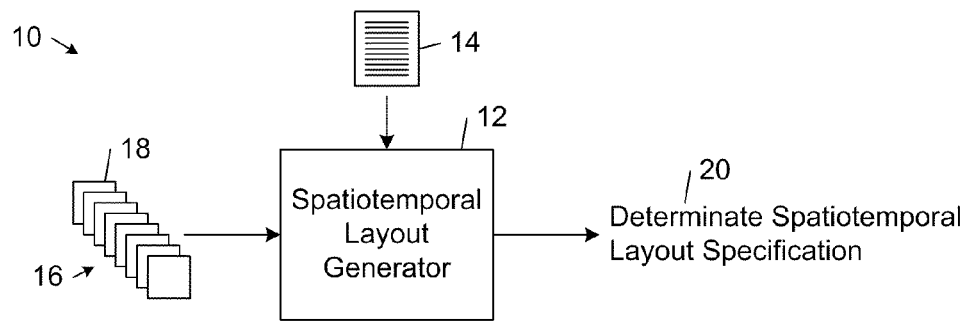
FIG. 1 is a block diagram of an embodiment of a spatiotemporal layout generation system that includes a spatiotemporal layout generator that processes a set of media objects in accordance with a relative spatiotemporal layout specification to produce a determinate spatiotemporal layout specification.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below are capable of organizing a collection of media objects into a spatiotemporal layout in which each media object is allocated to a respective slot in a scheduled rendering (or presentation) space that is divided both spatially and temporally.

The spatiotemporal layout typically is generated in accordance with a relative spatiotemporal layout specification that guides the spatial and temporal divisions of the presentation space into spatiotemporal slots and guides the allocation of media objects into the slots. The relative spatiotemporal layout specifications are generic specifications of relative spatial layouts of media object types and schedules for ordering the media object types in a particular rendering sequence. The relative spatiotemporal layout specifications specify relative spatiotemporal layouts without regard to any media objects or media object metadata (e.g., duration, aspect ratio, resolution, etc). In some embodiments, the relative spatiotemporal layout specifications are generated independently of any particular media objects by skilled multimedia artisans. In this way, the relative spatiotemporal layout specifications may embody the craft and aesthetics of professional multimedia artisans in a way that may be leveraged by unskilled users to produce high-quality presentations of their collections of media objects.

The embodiments that are described herein provide significant advantages in the consumer application space where they allow complex events to be documented in an appropriate form for media objects with contents that are inherently choppy and are in widely varying formats and resolutions.

II. Definition of Terms

The term "media object" refers broadly to any form of digital content, including text, audio, graphics, animated graphics, still images, full-motion video, and electronic proxies for physical objects. This content may be packaged and presented individually or in some combination in a wide variety of different forms, including documents, annotations, presentations, music, still photographs, commercial videos, home movies, and metadata describing one or more associated digital content files. Image-based media objects (or simply "images") may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image. The term "media object" encompasses both a single-element media object and a multi-element media object formed from a cohesive group or collection of one or more media objects. The assignment of single-element media objects to a particular multi-element media object signifies that the constituent single-element media objects are related. In general, the type of single-element media objects in a multi-element media object may be the same or different. The media objects typically are stored in one or more databases on one or more computer-readable media. The media objects may be stored physically in a local database or in one or more remote databases that may be accessed over a local area network and a global communication network. Some media objects also may be stored in a remote database that is accessible over a peer-to-peer network connection.

As used herein, the term "relative spatiotemporal layout" refers to a relative spatial arrangement and temporal sequence of media object types, where the absolute positions of the media object types and the absolute rendering times of the media object types are not specified. A relative spatiotemporal layout specification describes the relative spatial positions of the media object types over time.

As used herein, the term "determinate spatiotemporal layout" refers to a layout of media objects in a display area in a particular sequence in accordance with a determinate spatiotemporal layout specification that describes the positions, dimensions, and scheduled rendering periods of the media objects.

The term "data structure" refers broadly to the physical layout (or format) in which data is organized and stored.

A "computer" is a machine that processes data according to computer-readable instructions (e.g., software) that are stored on a computer-readable medium either temporarily or permanently. A set of such instructions that performs a particular task is referred to as a program or software program.

The term "computer-readable medium" refers to any medium capable of storing information that is readable by a computer. Examples of computer-readable media are storage devices suitable for tangibly embodying instructions and data include, but are not limited to, all forms of computer-readable memory, including non-volatile forms, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

III. Overview

FIG. 1 shows an embodiment of a spatiotemporal layout generation system 10 that includes a spatiotemporal layout generator 12 that processes a set 16 of media objects 18 in accordance with a relative spatiotemporal layout specification 14 to produce a determinate spatiotemporal layout specification 20. The relative spatiotemporal layout specification describes relative spatial positions and temporal order of media object types, whereas the determinate spatiotemporal layout specification 20 describes a layout of the media objects 18 in a display area over time.

Figure 2:
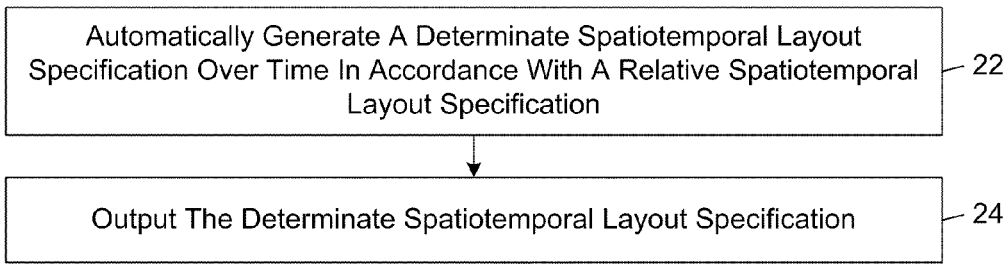
FIG. 2 is a flow diagram of an embodiment of a spatiotemporal layout generation method.

FIG. 2 shows an embodiment of a method that is implemented by the spatiotemporal layout generator 12.

In accordance with the method of FIG. 2, the spatiotemporal layout generator 12 automatically generates the determinate spatiotemporal layout specification 20 in accordance with the relative spatiotemporal layout specification 14 (FIG. 2, block 22). In this process, the spatiotemporal layout generator 12 determines for each of the media objects 18 a respective spatiotemporal slot corresponding to a respective window in the display area over a respective rendering period in which the media object is scheduled to be rendered.

The spatiotemporal layout generator 12 outputs the determinate spatiotemporal layout specification 20 (FIG. 2, block 24). In some embodiments the spatiotemporal layout generator 12 outputs the determinate spatiotemporal layout specification 20 by storing it on a computer-readable medium. In these embodiments, the spatiotemporal layout generator 12 typically outputs the determinate spatiotemporal layout specification 20 in the form of a specification that includes a data structure (e.g., a table or a list) that describes the allocation of the media objects 18 to slots in a scheduled rendering (or presentation) space that is divided both spatially and temporally. In some embodiments, the specification is stored on a computer-readable medium in an XML (eXtensible Markup Language) file format.

In some embodiments, the spatiotemporal layout generation system 10 renders a determinate spatiotemporal layout of the media objects 18 in accordance with the determinate spatiotemporal layout specification 20. For example, in some embodiments, the spatiotemporal layout generation system 10 renders the determinate spatiotemporal layout of the media objects 18 on a display. The display may be, for example, a flat panel display, such as a LCD (liquid crystal display), a plasma display, an EL display (electro-luminescent display) and a FED (field emission display). In other embodiments, the spatiotemporal layout generation system 10 renders the determinate spatiotemporal layout of the media objects 18 on a print medium (e.g., one or more sheets of paper).

In some embodiments, the determinate spatiotemporal layout specification 20 corresponds to an output video file that can be rendered by a video player to present the corresponding spatiotemporal layout of the media objects 18. In these embodiments, the output video file is stored on a computer-readable medium in accordance with a video file format (e.g., AVI, MOV, MPEG-2, MPEG-4, Ogg, ASF, RealMedia, and 3gp). In some embodiments, the determinate spatiotemporal layout specification 20 corresponds to parsable video playback instructions that cause a machine (e.g., a computer) to present a composite video corresponding to the spatiotemporal layout of the media objects 18. In these embodiments, the instructions are stored on a computer-readable medium in accordance with a multimedia authoring scripting language (e.g., Adobe Flash)® that can by run or parsed by a script interpreter (e.g., an Adobe Flash player) to render the spatiotemporal layout of the media objects 18. In some embodiments, the determinate spatiotemporal layout specification 20 corresponds to a video compositing specification (e.g., a script) that describes the way in which the spatiotemporal layout of the media objects 18 are to be presented in the display area. In these embodiments, the video compositing specification is processed by a video authoring tool (e.g., Adobe Flash or AviSynth) that produces an output video file (e.g., an AVI file) or a set of parsable video playback instructions (e.g., an Adobe Flash script or an AviSynth script) that can be processed to render the spatiotemporal layout of the media objects 18.

IV. Specifying Relative Spatiotemporal Layouts

A. Introduction

As explained above, the relative spatiotemporal layout specification 14 describes a spatial layout of media object types in a particular temporal sequence, where the absolute positions of the media object types and the absolute rendering periods of the media object types are not specified. The relative spatial positions of the media object types may be described, for example, in accordance with any type of floor plan model that describes the relative spatial positions of the media object types either in relation to each other or in relation to a common reference point (e.g., a corner point or an edge point of a common coordinate system). The relative spatiotemporal layout specification 14 describes a decomposition of a relative rendering space into slots each of which contains exactly one of the media object types.

Figure 3:
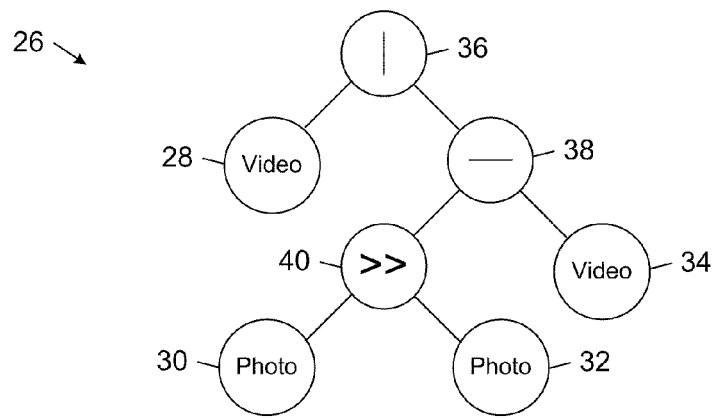
FIG. 3 is a diagrammatic view of an embodiment of a relative spatiotemporal layout specification.

FIG. 3 shows an embodiment of a relative spatiotemporal layout specification 14 that corresponds to a recursive partitioning (or subdividing) model of the relative rendering space. In this embodiment, the partitioning model is a binary spatiotemporal partitioning model that is organized into a tree structure 26. The tree structure 26 has leaf nodes 28, 30, 32, 34 corresponding to respective media object types and interior nodes 36, 38, 40 corresponding to partitions of the relative rendering space that is partitioned by the tree structure 26. In the illustrated embodiment, the vertical bar "|" denotes a vertical spatial division (or split) of the relative rendering space, the em dash "—" denotes a horizontal division of the relative rendering space, and the much greater than sign ">>" denotes a temporal division of the relative rendering space in which the left child node precedes the right child node in a relative rendering sequence. Thus, the recursive partitioning of the relative rendering space that is specified by the tree structure 26 corresponds to a first instance of a video media object type that is allocated to a spatiotemporal slot to the left of two successive instances of a photo media object type and a second instance of the video media object type, where the successive instances of the photo media object type are rendered in a top right spatiotemporal slot over a bottom right spatiotemporal slot containing the second instance of the video media object type.

Figure 4:
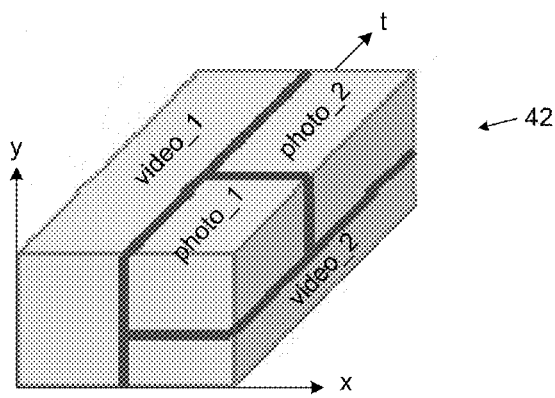
FIG. 4 is a diagrammatic view of an embodiment of a determinate spatiotemporal layout of media objects generated in accordance with the relative spatiotemporal layout specification of FIG. 3.

FIG. 4 shows an exemplary implementation of a determinate spatiotemporal layout of two videos (i.e., video_1 and video_2) and two photos (i.e., photo_1 and photo_2) that are allocated to respective slots in a scheduled rendering space 42 in accordance with the spatiotemporal partitioning specification that is represented by the binary tree structure 26.

The spatiotemporal partitioning specification that is represented by the tree structure 26 also can be specified using an analogous textual schema that defines a recursive spatiotemporal partitioning of the relative rendering space. In accordance with this schema:

- a vertical bar "|" denotes a vertical spatial division of the relative rendering space, where the element (i.e., one or more instances of one or more media object types) identified on the left side of vertical bar is positioned to the left of the element identified on the right side of the vertical bar;
- a dash "—" denotes a horizontal division of the relative rendering space, where the element (i.e., one or more instances of one or more media object types) identified on the left side of horizontal bar is positioned over the element identified on the right side of the horizontal bar; and
- a much greater than sign ">>" denotes a temporal division of the relative rendering space in which the element on the left side of the much greater than sign precedes the element on the right side of the much greater than sign.

In some embodiments, the schema additionally includes tags or other metadata that allows a designer of the relative spatiotemporal layout specification to specify one or more media object selection criteria for a designated one of the slots. In response to such media object selection criteria, the spatiotemporal layout generator 12 assigns one of the media objects 18 in the set 16 to the designated slot based on a user's indication that the assigned media object matches the media object selection criterion. Among the various types of media object selection criteria tags that can be included in the schema are the following:

- underscores on opposite sides of a media type designation (i.e., "_MediaType_") denotes that the media object allocated to the corresponding spatiotemporal slot in the determinate spatiotemporal layout should be a media object of the specified MediaType that is identified by a user as representative of the theme that the user would like the determinate spatiotemporal layout specification 20 to convey; and
- an exclamation point ("!") immediately following a media type designation (i.e., "MediaType!") denotes that the media object allocated to the corresponding spatiotemporal slot in the determinate spatiotemporal layout should be a media object of the specified MediaType that is identified by a user as representative of a climatic event of the determinate spatiotemporal layout specification 20.

Thus, in accordance with the schema described above, the spatiotemporal relative partitioning specification that is represented by the tree structure 26 shown in FIG. 3 is equivalently specified by the following textual description in a computer language consisting of a single expression:

video|((photo>>photo)—video)

Figure 5A:
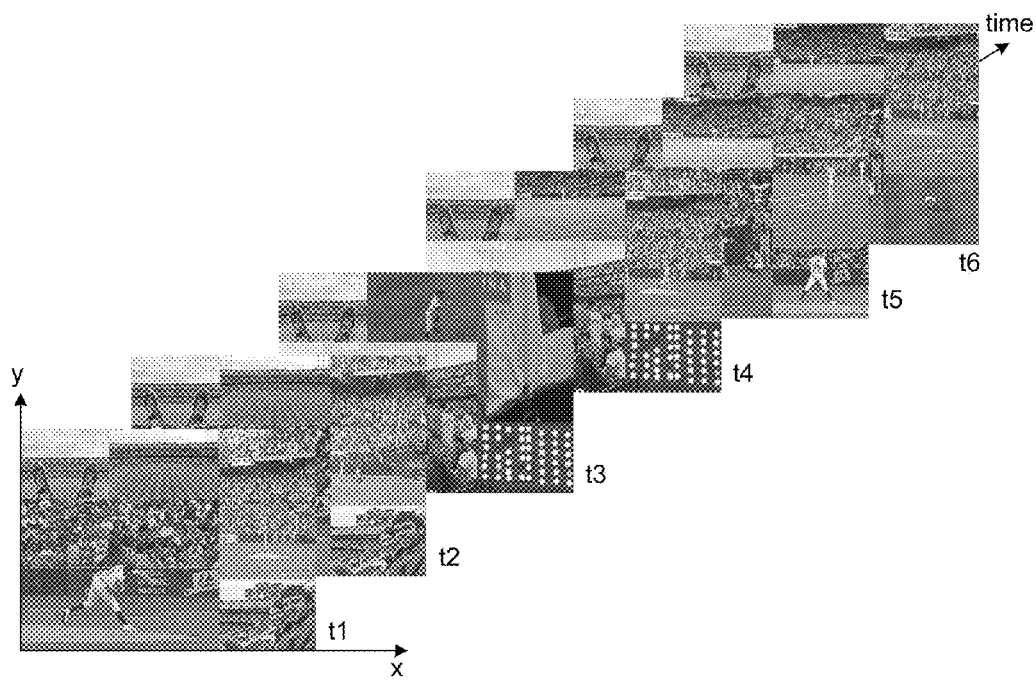
FIG. 5A is a diagrammatic view of a set of image frames extracted from an embodiment of a determinate spatiotemporal layout of media objects.

FIG. 5A shows a set of image frames that have been extracted from an embodiment of a determinate spatiotemporal layout of media objects at successive times t1, t2, t3, t4, t5, t6. This embodiment was generated from a user-selected set of ten photo media objects and two video media objects in accordance with the following relative partitioning specification:

| ( | ( _photo_ | (photo > > photo > > video) |
|---|---|---|
|   | — |   |
|   | (photo > > photo > > photo > > photo)   ) |   |
|   | \| |   |
| ( | video! |   |
|   | — |   |
|   | (photo > > photo > > photo > > photo)   ) |   |

Figure 5B:
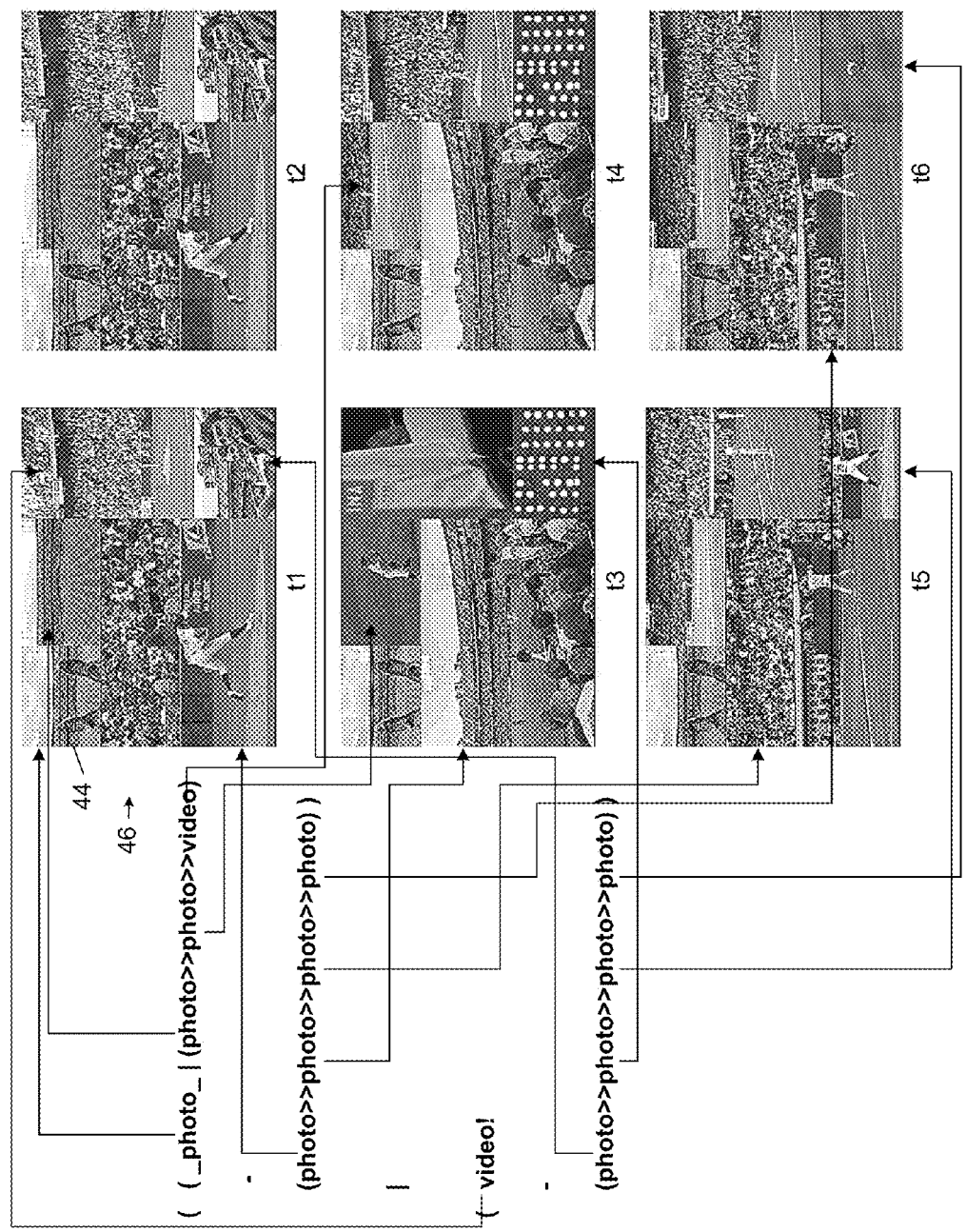
FIG. 5B shows the correspondences between the elements of the image frames shown in FIG. 5A and the elements of a corresponding relative spatiotemporal layout specification.

FIG. 5B shows the correspondences between the elements of the image frames shown in FIG. 5A and the elements of the corresponding relative partitioning specification. In this example, the photo 44 rendered in the window in the upper left corner of the display area 46 was selected by the user as the thematic photo of the determinate spatiotemporal layout and the video 48 in the upper right corner of the display area 46 was selected by the user as the climatic video of the determinate spatiotemporal layout.

B. Exemplary Relative Spatiotemporal Layout Specification Embodiments

The relative spatiotemporal partitioning methods that are described in the preceding section enable a wide variety of different relative spatiotemporal layouts to be specified. The following relative spatiotemporal layouts are described herein for illustrative purposes only and in no way limits the number and variety of possible relative layouts that can be described using these partitioning methods.

Figure 6:
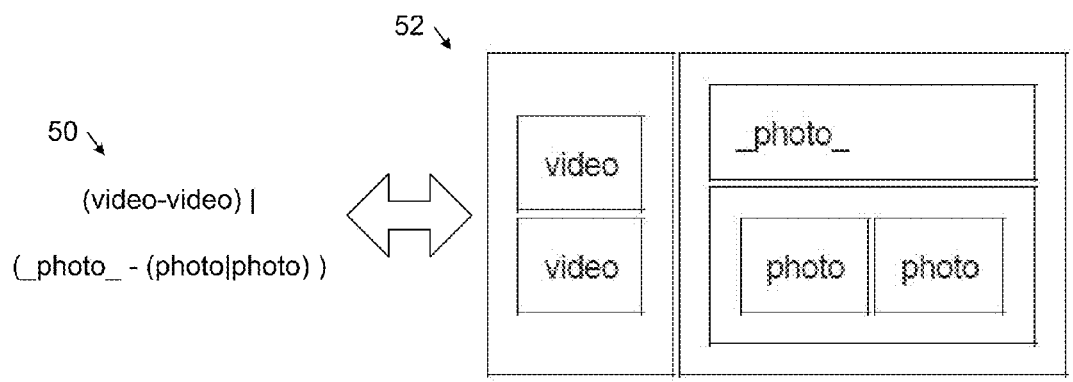
FIG. 6 is a diagrammatic view of two representations of an embodiment of a relative spatiotemporal layout specification.

FIG. 6 shows embodiments of a textual specification 50 and a graphical specification 52 of the same relative spatiotemporal layout. In these embodiments, two instances of a video media object type are positioned over each other in respective slots that are to the left of a thematic instance of the photo media object type in a slot over two side-by-side instances of the photo media object type.

Figure 7:
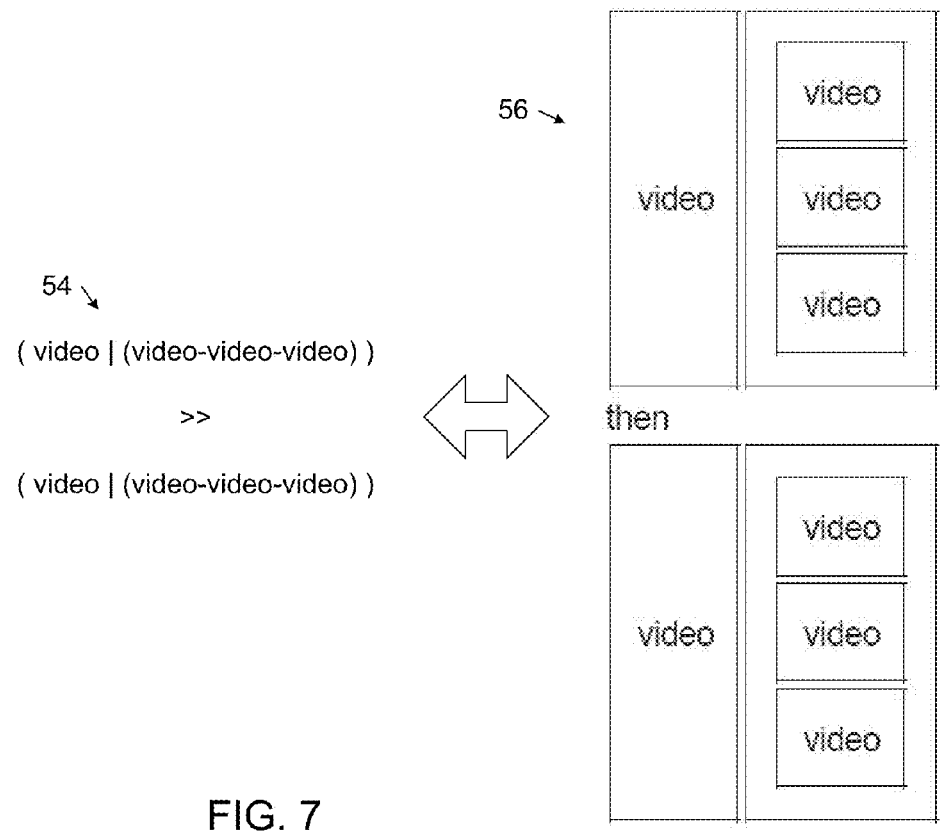
FIG. 7 is a diagrammatic view of two representations of an embodiment of a relative spatiotemporal layout specification.

FIG. 7 shows embodiments of a textual specification 54 and a graphical specification 56 of the same relative spatiotemporal layout. These embodiments specify a first allocation of media object types to a set of spatiotemporal slots followed in time by a second allocation of media object types to a set of spatiotemporal slots. Each of these allocations consists of a respective instance of a video media object type positioned in a slot that is to the left of three vertically distributed slots containing respective instances of the video media object type.

Figure 8:
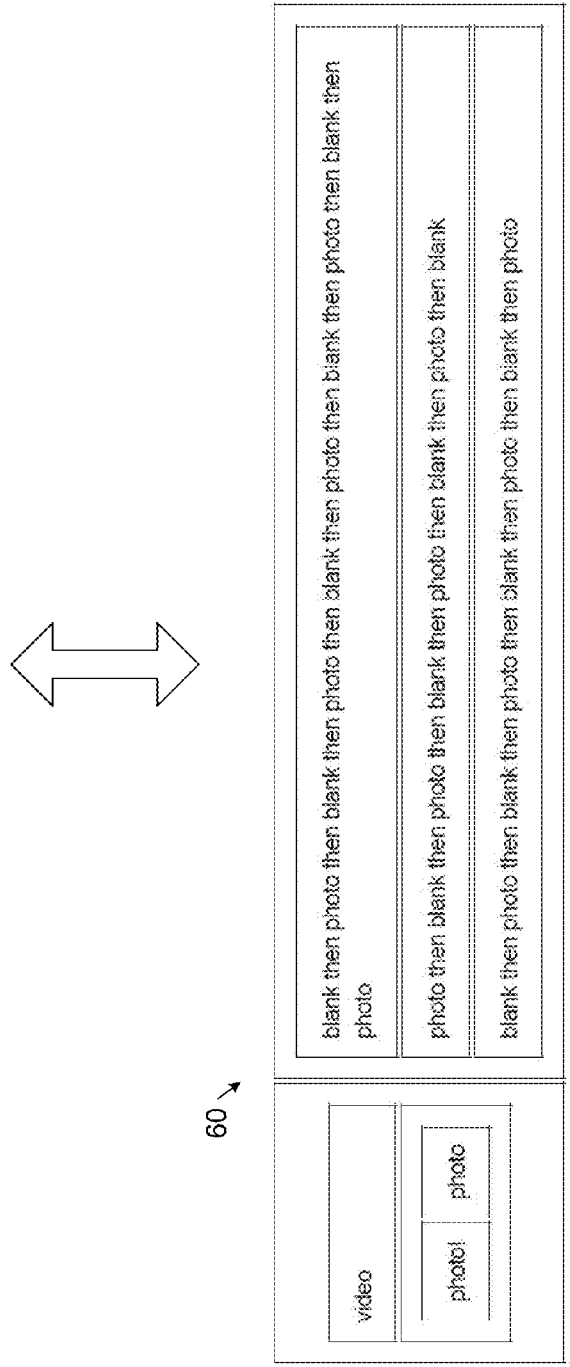
FIG. 8 is a diagrammatic view of two representations of an embodiment of a relative spatiotemporal layout specification.

FIG. 8 shows embodiments of a textual specification 58 and a graphical specification 60 of the same relative spatiotemporal layout. The textual description shows that the computer language can have a sequence of statements before the single expression. These statements can set the values of variables to sub-expressions that can then be combined in the final expression. These embodiments specify a first arrangement of media object types that is positioned to the left of a second arrangement of media object types. In the first arrangement, an instance of a video media object type is allocated to a slot positioned over a pair of side-by-side slots respectively containing a left thematic instance of a photo media object type and a right instance of the photo media object type. The second arrangement consists of a vertical arrangement of three sequences of slots, where the slots in the top sequence respectively contain the following sequence of media object type instances: blank, followed by photo, followed by, blank, followed by photo, followed by blank, followed by photo, followed by blank, followed by photo, followed by blank, followed by photo;

the slots in the middle sequence respectively contain the following sequence of media object type instances: photo, followed by, blank, followed by photo, followed by blank, followed by photo, followed by blank, followed by photo, followed by blank; and the slots in the bottom sequence respectively contain the following sequence of media object type instances: blank, followed by photo, followed by, blank, followed by photo, followed by blank, followed by photo, followed by blank, followed by photo.

In some of these embodiments, the "blank" media object type corresponds to a graphical media object that fills the spatial dimension of the slot to which it was allocated with a uniform color (e.g., white). In other ones of these embodiments, the "blank" media object type consists of some other content that a designer has selected to represent a gap or other transition between successive media objects.

Figure 9A:
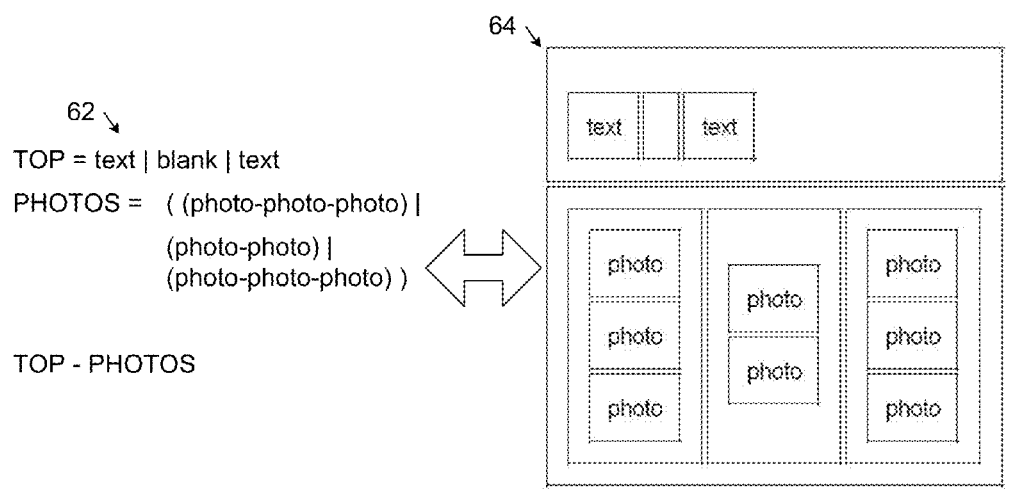
FIG. 9A is a diagrammatic view of two representations of an embodiment of a relative spatiotemporal layout specification.

FIG. 9A shows embodiments of a textual specification 62 and a graphical specification 64 of the same relative spatiotemporal layout. These embodiments specify a first ("TOP") arrangement of media object types that is positioned over a second arrangement ("PHOTOS") of media object types. The first arrangement consists of a horizontal arrangement of a first instance of a text media object type to the left of an instance of a blank media object that is to the left of a second instance of the text media object type. The second arrangement consists of a horizontal arrangement of a left group of media object types to the left of a middle group of media objects types that is to the left of a right group of media object types. Each of the left and right groups consists of a vertical arrangement of three slots each containing a respective instance of a photo media object type, and the middle group consists of a vertical arrangement of two slots each containing a respective instance of the photo media object type.

Figure 9B:
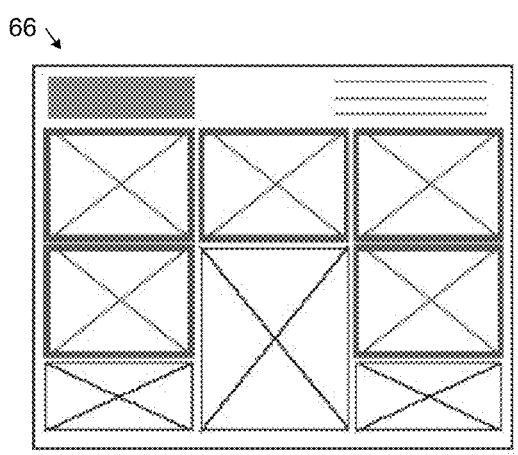
FIG. 9B is a diagrammatic view of an embodiment of a determinate spatiotemporal layout of media objects generated in accordance with the relative spatiotemporal layout specification represented in FIG. 9A.

FIG. 9B shows an exemplary embodiment of a determinate spatiotemporal layout 66 of media objects corresponding to the relative spatiotemporal layout specification shown in FIG. 9A.

V. Exemplary Embodiments of the Spatiotemporal Layout Generator

A. Introduction

Figure 10:
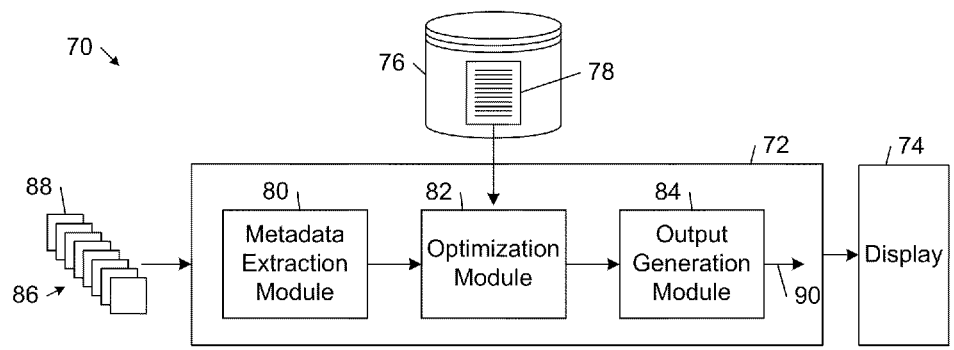
FIG. 10 is a block diagram of an embodiment of the spatiotemporal layout generation system shown in FIG. 1.

FIG. 10 shows an embodiment 70 of the spatiotemporal layout generation system 10 that includes an embodiment 72 of the spatiotemporal layout generator 12, a display 74, and a database 76 storing a set of relative spatiotemporal layout specifications 78. The spatiotemporal layout generator 72 includes a metadata extraction module 80, an optimization module 82, and an output generation module 84.

The spatiotemporal layout generator 72 operates on a collection 86 of media objects 88, which may be designated by the user or may be identified automatically by the spatiotemporal layout generator 72. The metadata extraction module 80 extracts values for various parameters, including the aspect ratio and duration (if applicable), from each of the media objects 88, and passes the extracted values to the optimization module 82.

The optimization module 82 determines values of the spatial and temporal parameters that define the slots in a determinate spatiotemporal layout of the media objects 88 in accordance with a multidimensional optimization process.

The optimization module 82 may use any one of a wide variety of multidimensional optimization methods in the process of determining the values of the spatial and temporal parameters that define the slots in a determinate spatiotemporal layout of the media objects 88. Among the exemplary types of optimization methods that might be used include, but are not limited to, simulated annealing optimization methods, hill climbing optimization methods, downhill simplex optimization methods, steepest descent optimization methods, and genetic optimization methods.

The optimization module 82 passes the parameter values to the output generation module 84, which generates a determinate spatiotemporal layout specification 90 from the received parameters values.

The spatiotemporal layout generation system 10 renders a determinate spatiotemporal layout of the media objects 88 corresponding to the determinate spatiotemporal layout specification 90 on the display 74.

B. Exemplary Embodiments of Simulated Annealing Optimization Processes for Determining a Determinate Spatiotemporal Layout

1. Introduction

This section describes an exemplary embodiment of a simulated annealing method that includes a main calling process and a primary simulated annealing routine. The simulated annealing method involves ascertaining a series of successive candidate determinate spatiotemporal layouts of the media objects 88 from an initial candidate determinate spatiotemporal layout of the media objects 88, through successive candidate determinate spatiotemporal layouts of the media objects 88 defined by different respective sets of spatial and temporal parameter values, to a final determinate spatiotemporal layout corresponding to the determinate spatiotemporal layout specification 90 in accordance with a process of optimizing an objective function characterizing the candidate determinate spatiotemporal layouts.

2. Exemplary Embodiment of the Primary Simulated Annealing Routine

Figure 11:
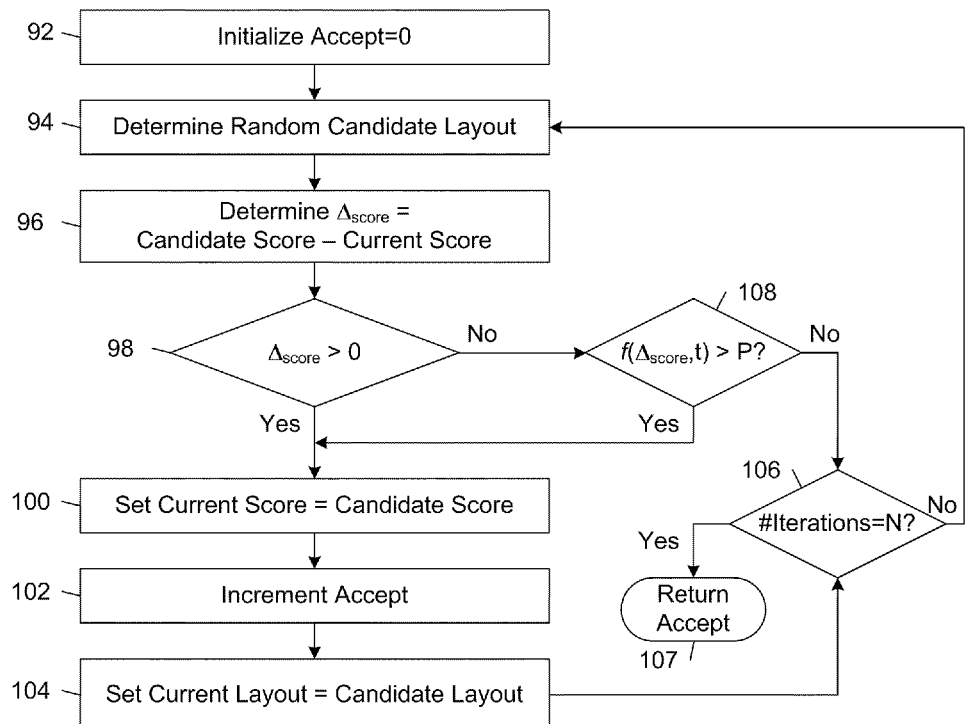
FIG. 11 is a block diagram of an embodiment of a multidimensional optimization process used in an embodiment of the spatiotemporal layout generation method of FIG. 2.

FIG. 11 shows an embodiment of a primary simulated annealing optimization routine that is used in an embodiment of the spatiotemporal layout generation method of FIG. 2 in generating the determinate spatiotemporal layout specification 20.

In accordance with the primary simulated annealing optimization routine to of FIG. 11, the optimization module 82 initializes the value of an Accept variable to 0 (FIG. 11, block 92). The optimization module 82 determines a random candidate layout (FIG. 11, block 94). The candidate layout typically is specified by a state vector containing values of the spatial and temporal parameters that define a respective determinate layout of the media objects 88 in a display area. The optimization module 82 determines the difference ($\Delta_{score}$) between the scores of the objective function characterizing the candidate layout and the current score (FIG. 11, block 96).

If $\Delta_{score} > 0$ (FIG. 11, block 98), the optimization module 82 sets the current score equal to the candidate score (FIG. 11, block 100), increments the Accept value (FIG. 11, block 102), and sets the current determinate spatiotemporal layout equal to the candidate determinate spatiotemporal layout (FIG. 11, block 104). If the number of iterations is not equal to N (e.g., 100) (FIG. 11, block 106), the process is repeated; otherwise, the optimization module 82 returns the value of the Accept variable to the main calling process (FIG. 11, block 107). If $\Delta_{score} \leq 0$ (FIG. 11, block 98), the optimization module 82 determines whether a move acceptance probability function $f(\Delta_{score}, t)$ is greater than P (FIG. 11, block 108), where P is a parameter that has a respective pseudo randomly generated probability value. In some embodiments, the random move function is given by $e^{\Delta_{score}/t}$ and P has a random value in the range [0,1). If $f(\Delta_{score}, t) > P$ (FIG. 11, block 108), then the optimization module 82 sets the current score equal to the candidate score (FIG. 11, block 100), increments the Accept value (FIG. 11, block 102), and sets the current determinate spatiotemporal layout equal to the candidate determinate spatiotemporal layout (FIG. 11, block 104). If $f(\Delta_{score}, t) \leq P$ (FIG. 11, block 108) and the number of iterations is not equal to N (FIG. 11, block 106), the process is repeated. If $f(\Delta_{score}, t) \leq P$ (FIG. 11, block 108) and the number of iterations is equal to N (e.g., 100) (FIG. 11, block 106), the optimization module 82 returns the value of the Accept variable to the main calling process (FIG. 11, block 107).

3. Exemplary Embodiments of Main Calling Processes

The simulated annealing optimization method of FIG. 11 typically is called multiple times by a main calling process that controls the number of iterations of the primary simulated annealing routine and the cooling schedule that sets a temperature parameter, t, which regulates the likelihood that any particular candidate layout will be accepted despite having a lower objective function score. In some embodiments, the main calling process changes the temperature parameter, t, each time after the optimization module 82 returns from the primary simulated annealing routine. A variety of different annealing schedules may be used to change the temperature parameter. For example, in some embodiments, the temperature parameter is reduced each time after the optimization module 82 returns from the primary simulated annealing routine. The amount by which the temperature parameter is reduced may be a fixed amount or it may vary as a function of the fraction of the time budget that has been expended or as a function of the current temperature value.

Figure 12:
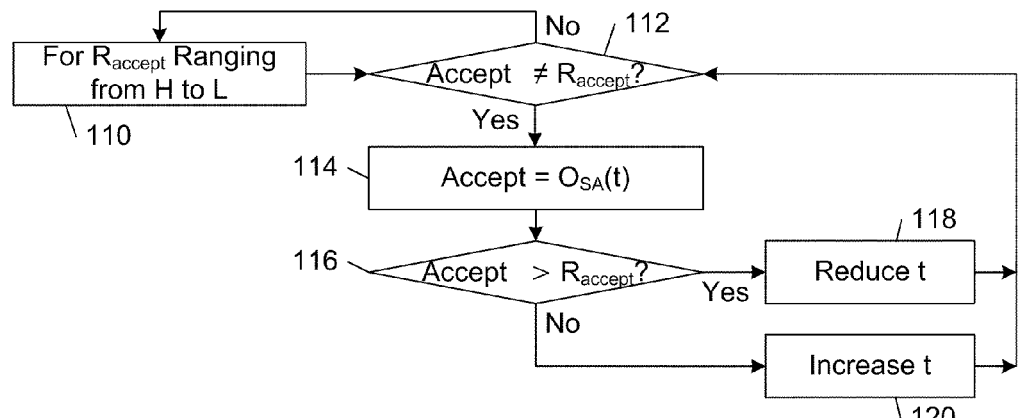
FIG. 12 is a block diagram of an embodiment of an adaptive scheduling process used together with the multidimensional optimization process of FIG. 11 in an embodiment of the spatiotemporal layout generation method of FIG. 2.

FIG. 12 shows an embodiment of an adaptive cooling schedule that is used together with the primary simulated annealing routine of FIG. 11 in an embodiment of the spatiotemporal layout generation method of FIG. 2. In accordance with the method of FIG. 12, the optimization module 82 initializes the value of the temperature parameter, t, to an initial (typically high) value. The optimization module 82 then begins the execution of a FOR loop in which the loop counter $R_{accept}$ decreases incrementally from a high value, H, to a low value, L (FIG. 12, block 110). If the current value of the Accept variable is equal to the current value of the loop counter (FIG. 12, block 112), the optimization module 82 proceeds to the next iteration (FIG. 12, block 110). As explained above, the value of the Accept variable is set by the primary simulated annealing routine of FIG. 11. If the current value of the Accept variable is not equal to the current value of the loop counter (FIG. 12, block 112), the optimization module 82 sets the value of the Accept variable by executing the primary simulated annealing routine of FIG. 11 with the current temperature value, t (FIG. 12, block 114). If the returned value of the Accept variable is greater than the current loop counter value (FIG. 12, block 116), the optimization module 82 reduces the temperature value (FIG. 12, block 118). In some embodiments, the optimization module 82 reduces the current temperature value by a fixed percentage (e.g., 1%). If the returned value of the Accept variable is less than or equal to the current loop to counter value (FIG. 12, block 116), the optimization module 82 increases the temperature value (FIG. 12, block 118). In some embodiments, the optimization module 82 increases the current temperature value by a fixed percentage (e.g., 1%).

In some embodiments, the optimization module 82 terminates the simulated annealing method after exiting the FOR loop in block 110 of FIG. 12.

In other embodiments, after exiting the FOR loop in block 110 of FIG. 12, the optimization module 82 continues to run the primary simulated annealing routine of FIG. 11 using a non-adaptive cooling schedule. In this process, the value of the temperature parameter, t, is reduced from its value at the end of the adaptive cooling process of FIG. 12 by a fixed percentage (e.g., 1%) for a specified number of iterations (e.g., 1000). In some of these embodiments, the optimization module 82 terminates the simulated annealing method after the specified number of iterations. In other ones of these embodiments, the optimization module 82 continues to run the primary simulated annealing routine of FIG. 11 after the specified number of iterations. In this process, the optimization module 82 runs the primary simulated annealing routine of FIG. 11 a specified number of iterations (e.g., 1000) with the value of the temperature parameter, t, set to 0 for each of the iterations.

4. Scoring Each Candidate Determinate Spatiotemporal Layout

As explained above, the optimization module 82 calculates a respective score for each of the candidate determinate spatiotemporal layouts. In some embodiments, the score is the weighted geometric mean of individual matching scores that measure of how close the parameters of each media object match the corresponding parameters of the spatiotemporal slots allocated to the media object. In some of these embodiments, the respective matching score for each media object is calculated from various factors, at least some of which measure the closeness of the media object to its current slot in terms of a respective ratio of the values of a particular parameter (e.g., aspect ratio or duration) for the media object and its current slot.

In some embodiments, the matching score for a graphical media object (e.g., a photo or a video) is a function of a distort factor and an area factor. The distort factor measures how close the aspect ratio of the media object matches the aspect ratio of its current slot. The area factor measures how close the fraction of the display area that is allocated to the media object corresponds to an equal division of the available display area. In some embodiments, the matching score corresponds to a weighted average of the distort factor and the area factor. In some of these embodiments, the distort factor is weighted more than the area factor.

In some embodiments, the matching score of each non-time-based media object (e.g., a photo) additionally incorporates a duration factor that measures how close the duration of its current slot matches a preferred duration specified for the media object. The preferred duration may be specified either by the user or by default. The duration factor typically is included in the weighted average of the distort factor and the area factor.

In some embodiments, the matching score of each time-based media object (e.g., a video) additionally incorporates a duration factor that measures how close its duration matches the duration of its current slot matches. The duration factor typically is included in the weighted average of the distort factor and the area factor.

In some embodiments, the matching score for text-based media objects is a function of preferred values for the height, width, and duration, which may be set by the user or by default. In some of these embodiments, the matching score for text-based media objects corresponds to the product of a width factor, a height factor, and a duration factor. The width factor corresponds to the smaller of the ratio of the preferred width to the slot width or the ratio of the slot width to the preferred width. The height factor corresponds to the smaller of the ratio of the preferred height to the slot height or the ratio of the slot height to the preferred height. The duration factor measures how close the slot duration matches a preferred duration specified for text-based media objects.

In some embodiments, the matching scores additionally incorporate one or more penalization factors that reduce the matching scores of media objects that are allocated to slots with one or more spatial or temporal dimensions that are below specified threshold dimensions.

VI. Exemplary Architecture of the Spatiotemporal Layout Generation System

Embodiments of the spatiotemporal layout generation system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., computer-readable code, such as computer software) for implementing the methods that are executed by the embodiments of the spatiotemporal layout generation system 10, as well as the data is generates, are stored in one or more computer-readable media.

Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the spatiotemporal layout generation system 10 may be implemented in any one of a wide variety of electronic devices, including computers (e.g., laptop or notebook computers, desktop computers, workstation computers, and server computers).

Figure 13:
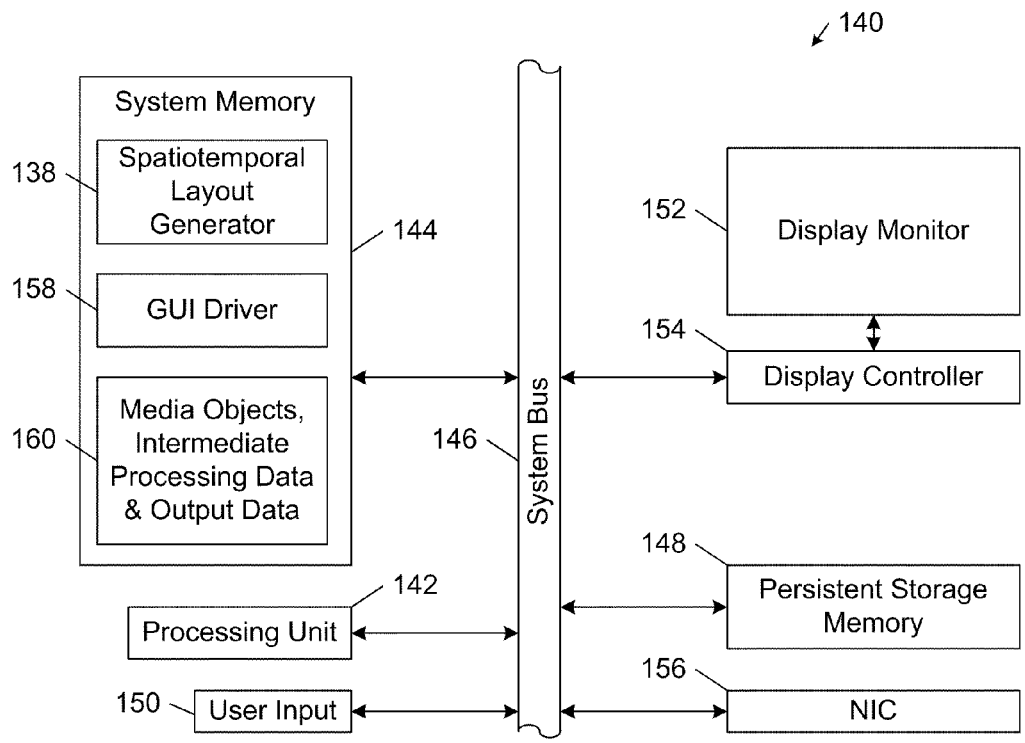
FIG. 13 is a block diagram of an embodiment of a computer system that is programmed to implement an embodiment of the spatiotemporal layout generation system of FIG. 1.

FIG. 13 shows an embodiment 138 of the spatiotemporal layout generation system 10 that is implemented by one or more software modules operating on a computer 140. The computer 140 includes a processing unit 142, a system memory 144, and a system bus 146 that couples processing unit 142 to the various components of the computer 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer 140 and a random access memory (RAM). The system bus 146 may be a memory bus, a peripheral bus or a local bus, and may be compatible with any of a variety of bus protocols, including PCI, VESA, Microchannel, ISA, and EISA. The computer 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer 30 using one or more input devices 150 (e.g., a keyboard, a computer mouse, a microphone, joystick, and touch pad). Information may be presented through a graphical user interface (GUI) that is displayed to the user on a display monitor 152, which is controlled by a display controller 154. The computer 30 also typically includes peripheral output devices, such as speakers and a printer. One or more remote computers may be connected to the computer 140 through a network interface card (NIC) 156.

As shown in FIG. 13, the system memory 144 also stores the spatiotemporal layout generation system 138, a GUI driver 158, and other data 160 including the media objects 18, intermediate processing data, and output data. The spatiotemporal layout generation system 138 interfaces with the GUI driver 158 and the user input 150 to control the creation of the determinate spatiotemporal layout specification. In some embodiments, the spatiotemporal layout generation system 138 additionally includes at least one of a video player and a script interpreter that are configured to render the spatiotemporal layout of the media objects 18 that is specified by the determinate spatiotemporal layout specification 20 by processing the specification 20. In some embodiments, the spatiotemporal layout generation system 138 interfaces with the GUI driver 158, the user input 150, the relative spatiotemporal layout specification 14, and other data structures in producing a graphical user interface that guides the user through the process of generating the determinate spatiotemporal layout specification 20. The spatiotemporal layout generation system 138 also interfaces with the GUI driver 158, the determinate spatiotemporal layout specification 20, and other data structures to control the presentation of determinate spatiotemporal layout of the media objects 18 to the user on the display monitor 152. The various media objects 18 that are used to render the presentation may be stored locally in persistent storage memory 148 or stored remotely and accessed through the NIC 156, or both.

VII. Conclusion

The embodiments that are described herein are capable of organizing a collection of media objects into a spatiotemporal layout in which each media object is allocated to a respective slot in a scheduled rendering (or presentation) space that is divided both spatially and temporally. The spatiotemporal layout typically is generated in accordance with a relative spatiotemporal layout specification that guides the spatial and temporal divisions of the presentation space into spatiotemporal slots and guides the allocation of media objects into the slots. In some embodiments, the relative spatiotemporal layout specifications are generated independently of any particular media objects by skilled multimedia artisans. In this way, the relative spatiotemporal layout specifications may embody the craft and aesthetics of professional multimedia artisans in a way that may be leveraged by unskilled users to produce high-quality presentations of their collections of media objects. The embodiments that are described herein provide significant advantages in the consumer application space where they allow complex events to be documented in an appropriate form for media objects with contents that are inherently choppy and are in widely varying formats and resolutions.

Other embodiments are within the scope of the claims.

What is claimed is:

1. A computer-implemented method, comprising:
automatically generating a determinate spatiotemporal layout specification in accordance with a relative spatiotemporal layout specification that describes relative spatial positions and temporal order of media object types, wherein the determinate spatiotemporal layout specification describes a layout of media objects in a display area over time, and the generating comprises determining for each of the media objects a respective spatiotemporal slot corresponding to a respective window in the display area over a respective rendering period in which the media object is scheduled to be rendered; and
outputting the determinate spatiotemporal layout specification.

2. The method of claim 1, wherein the determining comprises determining values of spatial parameters of the windows and values of temporal parameters of the rendering periods in accordance with a multidimensional optimization process.

3. The method of claim 2, wherein the determining comprises ascertaining a series of successive candidate determinate spatiotemporal layouts of the media objects from an initial candidate determinate spatiotemporal layout of the media objects, through successive candidate determinate spatiotemporal layouts of the media objects defined by different respective sets of spatial and temporal parameter values, to a final determinate spatiotemporal layout corresponding to the determinate spatiotemporal layout specification in accordance with a process of optimizing an objective function characterizing the candidate determinate spatiotemporal layouts.

4. The method of claim 2, wherein the determining comprises ascertaining the values of the spatial parameters and the temporal parameters in accordance with a simulated annealing optimization process.

5. The method of claim 4, wherein the ascertaining comprises iteratively performing the simulated annealing optimization process with an adaptive cooling schedule that depends on a count of successive ones of the candidate determinate spatiotemporal layouts having successively lower fraction of random moves that are accepted during each of one or more iterations of the simulated annealing process.

6. The method of claim 1, wherein the relative spatiotemporal layout specification comprises a media object selection criterion for a designated one of the slots, and the generating comprises assigning one of the media objects to the designated slot based on a user's indication that the assigned media object matches the media object selection criterion.

7. Apparatus, comprising:
a memory; and
a processing unit coupled to the memory and operable to perform operations comprising
automatically generating a determinate spatiotemporal layout specification in accordance with a relative spatiotemporal layout specification that describes relative spatial positions and temporal order of media object types, wherein the determinate spatiotemporal layout specification describes a layout of media objects in a display area over time, and the generating comprises determining for each of the media objects a respective spatiotemporal slot corresponding to a respective window in the display area over a respective rendering period in which the media object is scheduled to be rendered, and
outputting the determinate spatiotemporal layout specification.

8. The apparatus of claim 7, wherein in the determining the processing unit is operable to perform operations comprising determining values of spatial parameters of the windows and values of temporal parameters of the rendering periods in accordance with a multidimensional optimization process.

9. The apparatus of claim 8, wherein in the determining the processing unit is operable to perform operations comprising ascertaining a series of successive candidate determinate spatiotemporal layouts of the media objects from an initial candidate determinate spatiotemporal layout of the media objects, through successive candidate determinate spatiotemporal layouts of the media objects defined by different respective sets of spatial and temporal parameter values, to a final determinate spatiotemporal layout corresponding to the determinate spatiotemporal layout specification in accordance with a process of optimizing an objective function characterizing the candidate determinate spatiotemporal layouts.

10. The apparatus of claim 8, wherein in the determining the processing unit is operable to perform operations comprising ascertaining the values of the spatial parameters and the temporal parameters in accordance with a simulated annealing optimization process.

11. A non-transitory computer-readable medium storing computer-readable instructions causing a computer to perform operations comprising:
  automatically generating a determinate spatiotemporal layout specification in accordance with a relative spatiotemporal layout specification that describes relative spatial positions and temporal order of media object types, wherein the determinate spatiotemporal layout specification describes a layout of media objects in a display area over time, and the generating comprises determining for each of the media objects a respective spatiotemporal slot corresponding to a respective window in the display area over a respective rendering period in which the media object is scheduled to be rendered; and
  outputting the determinate spatiotemporal layout specification.

12. The computer-readable medium of claim 11, wherein in the determining the computer-readable instructions cause the computer to perform operations comprising determining values of spatial parameters of the windows and values of temporal parameters of the rendering periods in accordance with a multidimensional optimization process.

13. The computer-readable medium of claim 12, wherein in the determining the computer-readable instructions cause the computer to perform operations comprising ascertaining a series of successive candidate determinate spatiotemporal layouts of the media objects from an initial candidate determinate spatiotemporal layout of the media objects, through successive candidate determinate spatiotemporal layouts of the media objects defined by different respective sets of spatial and temporal parameter values, to a final determinate spatiotemporal layout corresponding to the determinate spatiotemporal layout specification in accordance with a process of optimizing an objective function characterizing the candidate determinate spatiotemporal layouts.

14. The computer-readable medium of claim 13, wherein in the determining the computer-readable instructions cause the computer to perform operations comprising ascertaining the values of the spatial parameters and the temporal parameters in accordance with a simulated annealing optimization process.

15. The computer-readable medium of claim 14, wherein in the ascertaining the computer-readable instructions cause the computer to perform operations comprising iteratively performing the simulated annealing optimization process with an adaptive cooling schedule that depends on a count of successive ones of the candidate determinate spatiotemporal layouts having successively better object function scores during each of one or more iterations of the simulated annealing process.

16. The method of claim 1, wherein each of the windows is a rectangular region of the display area in which one or more respective media objects are scheduled to be rendered.

17. The method of claim 16, wherein the determining comprises assigning at least one video media object for rendering in a respective one of the windows.

18. The method of claim 1, wherein the determining comprises determining only one of the media objects for each of the spatiotemporal slots.

19. The method of claim 1, wherein the determining comprises assigning media objects to the spatiotemporal slots according to the relative spatial positions and temporal order of the media object types described in the relative spatiotemporal layout specification.

20. The method of claim 1, wherein the relative spatiotemporal layout specification describes a decomposition of a relative rendering space into slots each of which contains exactly one of the media object types.

* * * * *